(12) United States Patent
Lu et al.

(10) Patent No.: US 10,133,882 B2
(45) Date of Patent: Nov. 20, 2018

(54) IMPLEMENTATION METHOD FOR DRIVING OF SOFTWARE AND HARDWARE SUPPORTING OPENSC

(71) Applicant: FEITIAN TECHNOLOGIES CO., LTD., Haidian District, Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 202 days.

(21) Appl. No.: 15/029,989

(22) PCT Filed: Sep. 18, 2014

(86) PCT No.: PCT/CN2014/086840
§ 371 (c)(1),
(2) Date: Apr. 15, 2016

(87) PCT Pub. No.: WO2015/062373
PCT Pub. Date: May 7, 2015

(65) Prior Publication Data
US 2016/0253525 A1    Sep. 1, 2016

(30) Foreign Application Priority Data
Oct. 29, 2013  (CN) .......................... 2013 1 0520252

(51) Int. Cl.
*G06F 21/77* (2013.01)
*G06F 21/62* (2013.01)
(Continued)

(52) U.S. Cl.
CPC .............. *G06F 21/77* (2013.01); *G06F 21/34* (2013.01); *G06F 21/6218* (2013.01);
(Continued)

(58) Field of Classification Search
None
See application file for complete search history.

(56) References Cited

U.S. PATENT DOCUMENTS

| 7,097,107 B1 * | 8/2006 | Guthery | G06Q 20/341 |
| | | | 235/487 |
| 7,907,935 B2 * | 3/2011 | Le Saint | G06F 21/31 |
| | | | 455/411 |

(Continued)

FOREIGN PATENT DOCUMENTS

| CN | 101551784 A | 10/2009 |
| CN | 102055759 A | 5/2011 |

(Continued)

OTHER PUBLICATIONS

Talamo et al., "Secure Messaging Implementation in OpenSC", Journal of Information Security, 2012, 3, 251-258.*

(Continued)

*Primary Examiner* — Piotr Poltorak
(74) *Attorney, Agent, or Firm* — Harness, Dickey & Pierce, P.L.C.

(57) ABSTRACT

Disclosed is an implementation method for driving of software and hardware supporting OpenSC. The method is implemented by middleware invoking an interface function, and comprises invocation of a function for initializing an interface, invocation of functions for establishing an encrypted communications environment, selecting a file interface, and selecting a file to operate, invocation of a function for setting a safe environment interface, and invocation of functions for building an APDU for setting a safe environment and setting a safe environment and a signature interface by sending the APDU, and building of a signed APDU and execution, by sending the APDU, of a signature operation on an original text to be signed.

15 Claims, 7 Drawing Sheets

(51) Int. Cl.
*H04L 29/06* (2006.01)
*G06F 21/34* (2013.01)
*G06F 21/64* (2013.01)

(52) U.S. Cl.
CPC .......... *G06F 21/64* (2013.01); *H04L 63/0823* (2013.01); *G06F 2221/2107* (2013.01); *H04L 63/0853* (2013.01)

(56) References Cited

U.S. PATENT DOCUMENTS

| | | | |
|---|---|---|---|
| 8,335,932 B2 | 12/2012 | von Behren et al. | |
| 8,352,749 B2 | 1/2013 | von Behren et al. | |
| 8,793,508 B2 | 7/2014 | von Behren et al. | |
| 8,995,663 B2 | 3/2015 | Lu et al. | |
| 2002/0082847 A1* | 6/2002 | Vandewalle | G06Q 20/341 719/330 |
| 2003/0046590 A1* | 3/2003 | Bender | H04L 63/0853 726/21 |
| 2003/0177353 A1* | 9/2003 | Hiltgen | G06F 21/34 713/161 |
| 2004/0143739 A1* | 7/2004 | de Jong | G06F 21/51 713/176 |
| 2004/0154027 A1* | 8/2004 | Vandewalle | G06F 9/548 719/330 |
| 2004/0205714 A1* | 10/2004 | Odinak | G06Q 20/341 717/118 |
| 2005/0022169 A1* | 1/2005 | Perlin | G06F 11/3656 717/124 |
| 2005/0184163 A1* | 8/2005 | de Jong | G06Q 20/341 235/492 |
| 2005/0211759 A1* | 9/2005 | Breslin | G06Q 20/341 235/375 |
| 2006/0085848 A1* | 4/2006 | Aissi | G06Q 20/341 726/9 |
| 2007/0228164 A1* | 10/2007 | Lu | G06F 13/385 235/441 |
| 2008/0148388 A1* | 6/2008 | Wooten | G06F 21/34 726/17 |
| 2009/0064301 A1* | 3/2009 | Sachdeva | G06F 9/468 726/9 |
| 2009/0265722 A1* | 10/2009 | Lu | G06F 13/387 719/327 |
| 2010/0134274 A1 | 6/2010 | Singh et al. | |
| 2010/0146279 A1* | 6/2010 | Lu | G06F 13/10 713/172 |
| 2011/0119766 A1* | 5/2011 | Lu | G06F 1/14 726/26 |
| 2011/0196788 A1* | 8/2011 | Lu | G06Q 20/105 705/41 |
| 2012/0084855 A1* | 4/2012 | Hofer | G06F 21/34 726/18 |
| 2012/0124380 A1* | 5/2012 | Lu | G06F 9/4411 713/176 |
| 2012/0131679 A1* | 5/2012 | Lu | G06F 21/121 726/26 |
| 2012/0159148 A1 | 6/2012 | Von Behren et al. | |
| 2012/0159163 A1 | 6/2012 | von Behren et al. | |
| 2012/0278508 A1* | 11/2012 | Lu | G06F 13/385 710/6 |
| 2012/0291023 A1* | 11/2012 | Lu | G06F 9/4411 717/178 |
| 2012/0296819 A1* | 11/2012 | Lu | G06Q 20/352 705/41 |
| 2013/0010955 A1 | 1/2013 | Lu et al. | |
| 2013/0042029 A1* | 2/2013 | Lu | G06F 21/44 710/15 |
| 2013/0121493 A1 | 5/2013 | von Behren et al. | |
| 2016/0085609 A1 | 3/2016 | Lu et al. | |

FOREIGN PATENT DOCUMENTS

| | | |
|---|---|---|
| CN | 103138937 A | 6/2013 |
| CN | 103186812 A | 7/2013 |
| CN | 103218560 A | 7/2013 |
| CN | 103544037 A | 1/2014 |
| EP | 2638529 A1 | 9/2013 |

OTHER PUBLICATIONS

Cucinotta (Cucinotta et al., "An open middleware for smart cards" Comput Syst Sci & Eng. (2005) 6: 439-450, vol. 20 No. 6, Nov. 2005.*
International Search Report, ISA/CN, Haidian District, Beijing, dated Dec. 15, 2014.
Written Opinion of the ISA, ISA/CN, Haidian District, Beijing, dated Dec. 15, 2014.
First Chinese Office Action regarding Application No. 201310520252.2 dated Feb. 24, 2016. English translation provided by Unitalen Attorneys at Law.
Wang, Jiali: "Design and Implementation of Smart Card File System Based on the PKCS#15 Specification," China Master's Theses Full-text Database, Information Science and Technology, No. 10, Jun. 2012.

* cited by examiner

IMPLEMENTATION METHOD FOR DRIVING OF SOFTWARE AND HARDWARE SUPPORTING OPENSC

This application is the US national phase of International Application No. PCT/CN2014/086840 filed on Sep. 18, 2014, which claims priority to Chinese patent application, titled "IMPLEMENTATION METHOD FOR DRIVING OF SOFTWARE AND HARDWARE SUPPORTING OPENSC" with Application Number of 201310520252.2 and filed with the Chinese Patent Office on Oct. 29, 2013, which are hereby incorporated by reference in their entirety.

FIELD OF THE INVENTION

The present application relates to information security field, more particularly to an implementation method for driving of software and hardware supporting OpenSC.

BACKGROUND OF THE INVENTION

OpenSC is a smart card project with open source, which is similar to middleware, and provides a set of drive interfaces which is convenient for respective manufacturers to add supportive devices of their own.

At present, smart card devices based on identity authentication is widely used. How to realize supporting smart card device based on OpenSC becomes a difficult technical problem which a middleware developer is eager to solve.

SUMMARY OF THE INVENTION

In order to overcome defection in the prior art, the present application provides an implementation method for driving of software and hardware supporting OpenSC.

The technical solution applied to the present application is an implementation method for driving of software and hardware supporting OpenSC, which is implemented by that a middleware invokes an interface function. The method includes:

building cipher text communication environment according to a communication key type of a card in a case that an initializing interface function is invoked, setting a key digit number supported by the card and returning an initialized result;

performing an operation of selecting a file according to attribution of a first structure in a selecting a file interface function in a case that the selecting a file interface function is invoked, returning a result of the operation of the selecting the file; the result of the operation of the selecting the file contains file controlling information in a case that the operation of selecting the file is successful;

obtaining key file attribution of the file controlling information according to a second parameter of the setting a security environment interface function in a case that a setting a security environment interface function is invoked, building an Application Protocol Data Unit (APDU) for setting a security environment according to the key file attribution, setting a security environment by transmitting the APDU for setting a security environment and returning a result of the setting;

obtaining original data to be signed and length of the original data according to a second parameter and a third parameter of a signature interface function in a case that the signature interface function is invoked, building signed APDU based on the original data to be signed and the length of the original data, performing a signature operation on the original data to be signed by transmitting the signed APDU and returning a result of the signature operation; returning the result of the signature operation containing a signature value in a case that the signature operation is successful.

The method further includes:

invoking a card operating function corresponding to a second parameter of a card operating interface function to perform an operation on the card in a case that the card operating interface function is invoked includes:

invoking a clearing a card interface function to clear data and a file structure in the card in a case that a value of a second parameter of the card operating interface function is a first value;

invoking a writing a key interface function to write a key in the card in a case that the value of the second parameter of the card operating interface function is a second value; and invoking a generating a key pair interface function to generate a key pair in the card in a case that the value of the second parameter of the card operating interface function is a third value.

Further, in a case that the clearing a card interface function is invoked, a master file (MF) in the card is selected, a deleting an in-card file interface function is invoked to delete the master file.

The method further comprises:

in a case that the deleting an in-card file interface function is invoked, the following steps are performed:

step 1 of selecting a file by invoking the selecting a file interface function according to a second parameter of the deleting an in-card file interface function and obtaining controlling information of a file; and step 2 of building APDU for deleting a file according to the obtained controlling information of the file and deleting the file by transmitting the APDU for deleting a file.

Further, in a case that the writing a key interface function is invoked, the following steps are performed:

step 1 of initializing information related to the key and a key modular length of the writing a key interface function according to a third parameter of the writing a key interface function;

step 2 of creating a private key file object in a memory of a computer, obtaining information related to the private key file object and creating a private key file in the card;

step 3 of setting a private key ID and the key modular length; and step 4 of writing a private key in the card and releasing the private key file object created in the memory.

In a case that the generating a key pair interface function is invoked, the following steps are performed:

step 1 of initializing related information and a key modular length of a key of the generating a key pair interface function according to a third parameter of the generating a key pair interface function;

step 2 of creating a private key file object in the memory of the computer, obtaining related information of the private key file object and creating a private key file in the card;

step 3 of creating a public key file object in the memory of the computer, obtaining related information of the public key file object and creating a public key file in the card;

step 4 of setting a public key ID and a private key ID and the key modular length; and step 5 of generating a key pair and releasing the public key file object and the private key file object created in the memory.

Further, the private key file object is created by invoking a newly creating a file interface function; the related information of the private key file object is obtained according to a fifth parameter of the newly creating a file interface function.

The operation of performing selecting the file according to attribution of the first structure in the selecting a file interface function includes: in a case that type attribution of the first structure is a second preset value, length attribution is 2 and a first byte of file ID attribution is a fourth preset value, pseudo file controlling information is built as the result of the operation of selecting the file. The second preset value is SC_PATH_TYPE_DF_NAME and the fourth preset value is 0x29.

The method further includes:

in a case that the newly creating a file interface function is invoked, the following steps are performed:

step 1 of obtaining related information of a file from a configuration file according to a second parameter of the newly creating a file interface function; and step 2 of creating the file in the card by invoking the creating a file interface function according to the obtained related information of the file;

in a case that a newly creating a standard file interface function is invoked, the following steps are performed:

step 1 of obtaining information related to a standard file from a configuration file according to a second parameter of the newly creating a standard file interface function; and step 2 of creating the standard file in the card by invoking the creating a file interface function according to the information related to the standard file.

The method further includes:

in a case that the creating a file interface function is invoked, the following steps are performed:

step 1 of building file controlling information; and step 2 of building APDU for creating a file according to the file controlling information and creating the file by transmitting the APDU for creating a file.

The method further includes:

in a case that a creating a PIN code interface function is invoked, the following steps are performed:

step 1 of defining and initializing a PIN code object;

step 2 of obtaining the PIN code object according to a first parameter of the writing a key interface function and invoking the writing a key interface function to write a secret file in the card; and step 3 of buffering the PIN code object in the memory.

In a case that the interface function is invoked, the method further includes locating a card to performs a specific operation according to a parameter transferred in from outside by the interface function and checking context environment attribution of the card.

By implementing the present application, the middleware and the smart card device are better combined and used under the OpenSC, which helps pushing the smart card device manufacturers to develop and apply multiple functions of the smart card device under OpenSC.

DETAILED DESCRIPTION

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure.

The present embodiment provides a method for implementing software and hardware drive supporting OpenSC. For example, when a middleware accesses a smart card device, the method is implemented by invoking an interface function by the middleware. The interface function may include part or all of the following interface functions: clearing a card interface function, generating a key pair interface function, selecting a file interface function, newly creating a file interface function, newly creating a standard file interface function, writing a key interface function, creating a PIN code interface function, creating a file interface function, a card operating interface function, deleting an in-card file interface function, signature interface function and setting a security environment interface function. The method includes:

The interface functions referred in the present application have an external incoming parameter card. When interface functions are invoked, a card which performs a specific operation is determined firstly according to the parameter card and context environment attribution of the card is checked and operation is performed on the determined card. In the following parts of the present embodiment, the parameter card is mentioned in part of the interface functions, other parts of the interface functions in which the parameter card has not been mentioned are all contain the parameter card and the functions of the parameter card are the same and not be repeated.

Figure 1:
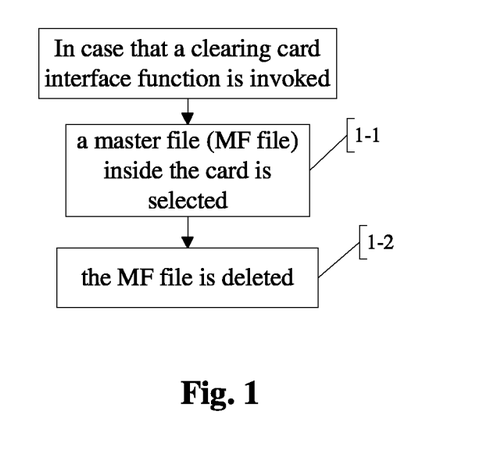
FIG. 1 is a flow chart in a case that a clearing a card interface function is invoked in the present embodiment of the present application.

In a case that the clearing a card interface function is invoked, as shown by FIG. 1, following operation is performed.

The clearing a card interface function is a erase_card, which includes a first parameter card; a card is determined according to the parameter card and the context environment attribution of the card is checked; whether the selecting a file interface and the deleting a file interface are supported is determined, in a case that the selecting a file interface and the deleting a file interface are supported, step 1-1 and step 1-2 is executed; otherwise, it is returned that the selecting a file interface and the deleting a file interface are not supported. The first parameter card is obtained from external, which is not limited by the present embodiment.

In step 1-1, a master file (MF file) inside the card is selected.

The master file inside the card is selected by invoking the selecting a file interface function select_file.

In step 1-2, the MF file is deleted.

An operation of clearing card inbuilt data is performed by invoking a card operation interface function card_ctl; a value of a second parameter of the card operation interface function card_ctl, i.e. cmd, is SC_CARDCTL_ERASE_CARD. In the present embodiment, MF file is deleted by invoking the card operation interface function card_ctl.

Figure 2:
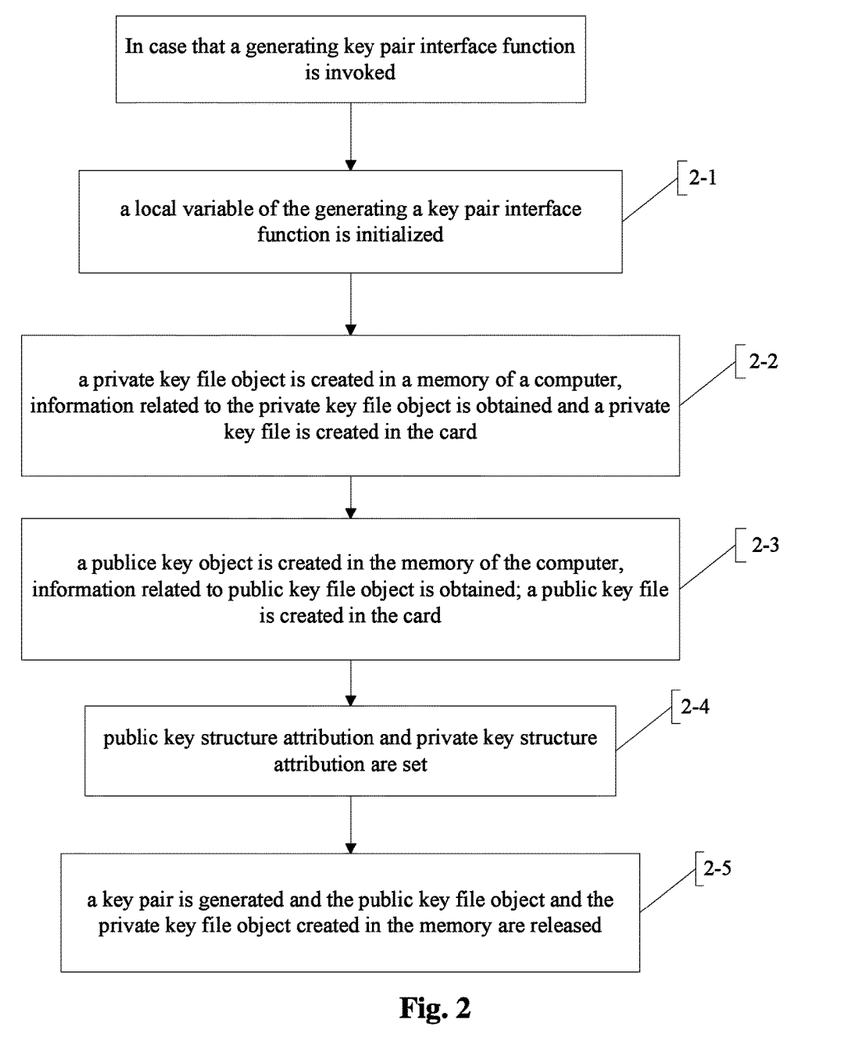
FIG. 2 is a flow chart in a case that a generating a key pair interface function is invoked in the present embodiment of the present application.

In a case that the generating a key pair interface function is invoked, as shown by FIG. 2, following operation is performed.

The generating a key pair interface function is generate_key, a first parameter profile and a third parameter obj in the function is obtained from external.

In step 2-1, a local variable of the generating a key pair interface function is initialized.

Information related to a key and a module length of the key is initialized according to a third parameter obj in the function generate_key. In addition, a key reference value is initialized.

In step 2-2, a private key file object is created in a memory of a computer, information related to the private key file object is obtained and a private key file is created in the card.

The newly creating a file interface function cosm_new_file is invoked to create the private key file object in the memory of the computer according to a first parameter profile in the function generate_key. In this case, a third parameter in the function cosm_new_file is SC_PKCS15_TYPE_PRKEY_RSA which indicates that a file object type is a private key file; a fifth parameter in the function cosm_new_file is file which is a structure pointer of a file memory object; information related to the private key file object is obtained by parameter file.

In step 2-3, a public key file object is created in the memory of the computer, information related to public key file object is obtained; a public key file is created in the card.

The newly creating a file interface function cosm_new_file is invoked according to a second parameter profile in the function generate_key to create the public key file object in the memory; in this case, a third parameter of the function cosm_new_file is SC_PKCS15_TYPE_PUBKEY_RSA which indicates that the file object type is a public key file object; a fifth parameter in the function cosm_new_file is pukf which is a structure pointer of a file memory object; information related to the public key file object is obtained by the parameter pukf.

In step 2-4, public key structure attribution and private key structure attribution are set.

Step 2-4 includes:
gendat.prkey_id=file->id; // set a private key ID
gendat.pukey_id=pukf->id; // set a public key ID
gendat.key_length=keybits, gendat.modulus=NULL; // set a key modular length, set a gendat.modulus as NULL.

The above private key ID and the public key ID is a part content of the information related to a key.

In step 2-5, a key pair is generated and the public key file object and the private key file object created in the memory are released.

Step 2-5 may include generating the key pair by invoking a card operating interface function card_ctl, where a value of a command filed cmd of the card operating interface function is SC_CARDCTL_ENTERSAFE_GENERATE_KEY.

In a case that the selecting a file interface function select_file is invoked, following operation is performed: an operation of selecting a file is performed according to attribution of a first structure in the function select_file, a result of the operation of the selecting the file is returned; when the operation of the selecting the file is performed successfully, the result of the operation of the selecting the file includes file controlling information, which is specifically includes:

an operation function is selected according to type attribution of a first structure in function select_file; the type attribution of the first structure in the function select_file is n_path->type in the present embodiment.

In a case that a value of the in_path->type is a first preset value, a first preset function is executed and an executed result is returned.

The first preset value is SC_PATH_TYPE_DF_NAME; the first preset function is select_aid in the present embodiment.

In a case that the value of the in_path->type is a second preset value, whether length attribution of the first structure in the function select_file is equal to 2 is determined, the function select_file returns an error code if the length attribution is not equal to 2; step 1 and step 2 are executed if the length attribution is equal to 2.

In the present embodiment, in a case that the second preset value is SC_PATH_TYPE_FILE_ID, the length attribution of the first structure is in_path->len, the error code returned by the function select_file is SC_ERROR_INVALID_ARGUMENTS.

In step 1, a structure pointer is defined and an initial value of the structure pointer is set as null.

In the present embodiment, the defined structure pointer may be sc_file_t*file.

In step 2, whether a first byte of file ID attribution of a first structure in function select_file is a fourth preset value is determined, pseudo file controlling information is built and a result of the operation is returned if the first byte of file ID attribution of the first structure in function select_file is the fourth preset value; otherwise, APDU of a selected file is built and a file is selected by sending the built APDU, the result of the operation is returned.

The fourth preset value is 0x29, the first byte of the file ID attribution of the first structure is in_path->value[0] and the value of 0x29 indicates that the file to be selected is a private key file; the APDU is sent by invoking a function sc_transmit_apdu, data returned by function sc_transmit_apdu is checked so as to determine whether the operation of selecting a file is successful, file controlling information is obtained by invoking a function construct_process_fci if the operation of selecting a file is successful, the function select_file returns a success result; otherwise, the function select_file returns an error code.

Further, when the operation of selecting a file is successful and a selected file type is DF, step 2 further includes updating related parameters in cache attribution card->cache of a second structure in the function select_file and assigning a parameter file to *file_out.

In a case that the value of in_path->type is a third preset value, a third preset function is executed and an execution result is returned.

In the present embodiment, the third preset value is SC_PATH_TYPE_PATH and the third preset function is select_path.

In a case that the value of in_path->type is another value, an error code is returned.

The error code is SC_ERROR_INVALID_ARGUMENTS.

Figure 3:
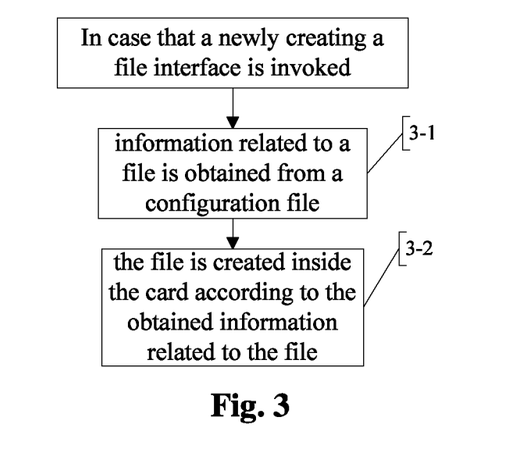
FIG. 3 is a flow chart in a case that a newly creating a file interface function is invoked in the present embodiment of the present application.

In a case that the newly creating a file interface function is invoked, as shown by FIG. 3, following operation is executed.

In this case, the newly creating a file interface function is cosm_new_file, the function includes a first parameter profile and a second parameter card which are obtained from external; a card is determined according to the second parameter card and the context environment attribution of the card is checked; whether creating a file interface is supported is determined, step 3-1 and step 3-2 are executed if the creating a file interface is supported; otherwise, it is returned that the creating a file interface is not supported.

In step 3-1, information related to a file is obtained from a configuration file.

Information related to the file is obtained from the configuration file by invoking obtaining file information function sc_profile_get_file according to a first parameter profile of the function cosm_new_file.

In step 3-2, the file is created inside the card according to the obtained information related to the file.

In the present embodiment, based on the difference of obtained information related to the file, the file, which may be MF, SKey-MF or DIR, is created inside the card by invoking the creating a file interface function create_file.

Figure 4:
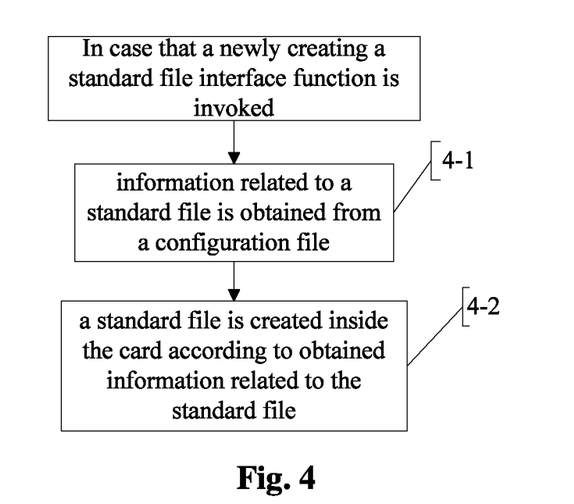
FIG. 4 is a flow chart in a case that a newly creating a standard file interface function is invoked in the present embodiment of the present application.

In a case that the newly creating a standard file interface function is invoked, as shown by FIG. 4, following operations are performed.

In this case, the newly creating a standard file interface function is cosm_new_PKCS#15_file, the function includes a first parameter profile and a second parameter card which are obtained from external; the card is determined according to the second parameter card and the context environment attribution of the card is checked; whether the creating a file interface is supported is determined, step 4-1 and step 4-2 are executed if the creating a file interface is supported; otherwise, it is returned that the creating a file interface is not supported.

In step 4-1, information related to a standard file is obtained from a configuration file.

The information related to the standard file is obtained from the configuration file by invoking an obtaining file information function sc_profile_get_file according to a first parameter profile of the function cosm_new_PKCS#15_file.

In step 4-2, a standard file is created inside the card according to obtained information related to the standard file.

In the present embodiment, based on difference of the obtained information related to the standard file, the standard file is created inside the card by invoking a creating a file interface function create_file.

In the present embodiment, the creating a standard file interface function is configured to create a file defined by PKCS#15 standard inside the card; the file includes PKCS15-AppDF, SKey-AppDF, MAXPIN, PKCS15-ODF, PKCS15-TokenInfo, PKCS15-UnusedSpace, PKCS15-AODF, PKCS15-PrKDF, PKCS15-PuKDF, PKCS15-CDF, PKCS15-DODF.

Figure 5:
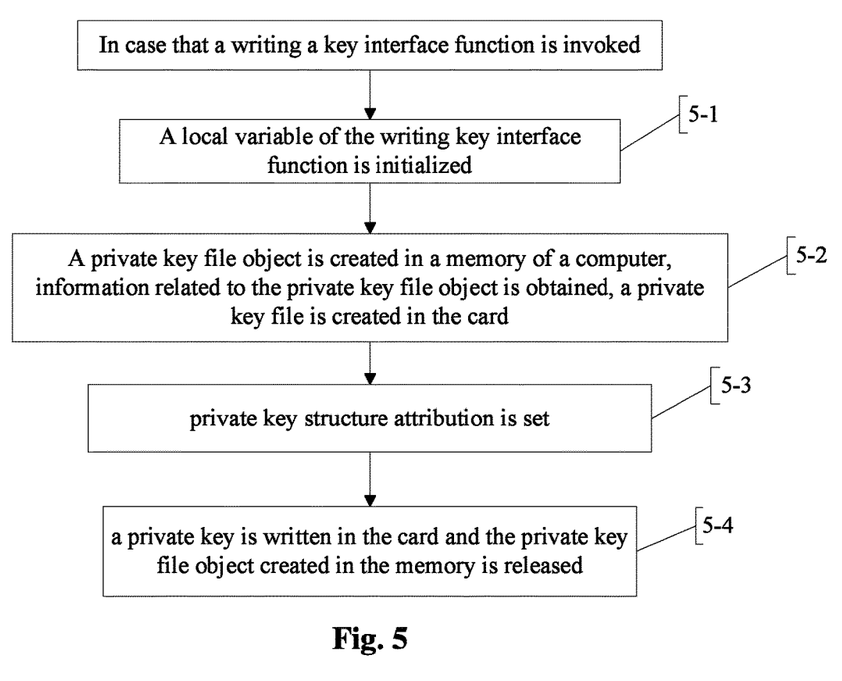
FIG. 5 is a flow chart in a case that a writing a key interface function is invoked in the present embodiment of the present application.

In a case that the writing a key interface function is invoked, as shown by FIG. 5, following operations are performed.

In this case, the writing a key interface function is write_key; the function is configured to write a key file into the card. A second parameter profile and a third parameter obj in the function write_key are obtained from external.

In step 5-1, a local variable of the writing a key interface function is initialized.

Information related to a key and a key modular length is initialized according to a third parameter obj of the function write_key. Further, a key reference value is initialized as well.

In step 5-2, a private key file object is created in the memory of the computer, information related to the private key file object is obtained; a private key file is created inside the card.

The private key file object is created in the memory by invoking a newly creating a file interface function cosm_new_file according to the second parameter profile of the function write_key; in this case, a third parameter of the function cosm_new_file is SC_PKCS15_TYPE_PRKEY_RSA which indicates that a file object type is the private key file object; a fifth parameter of function cosm_new_file is file which is a structure pointer of a file memory object; information related to the private key file object is obtained by parameter file.

In step 5-3, private key structure attribution is set.
Step 5-3 includes:
gendat.prkey_id=file->id; // set a private key ID
gendat.key_length=keybits, gendat.modulus=NULL; // set a key modular length, set gendat.modulus as NULL.

In step 5-4, a private key is written in the card and the private key file object created in the memory is released.

Step 5-4 specifically includes: writing the private key in the card by invoking card operating interface function card_ctl; in this case, command field cmd of the function card_ctl is SC_CARDCTL_ENTERSAFE_WRITE_KEY.

Figure 6:
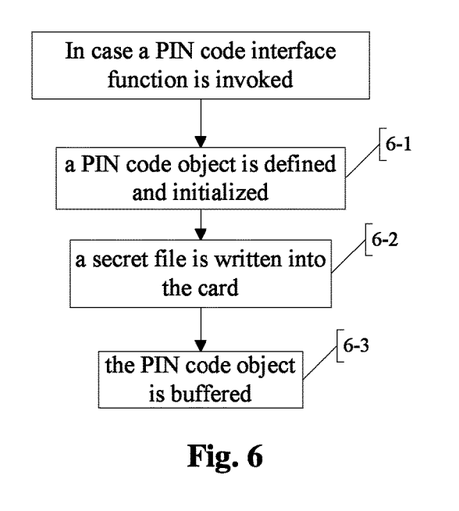
FIG. 6 is a flow chart in a case that a creating a PIN code interface function is invoked in the present embodiment of the present application.

In a case that the creating a PIN code interface function is invoked, as shown by FIG. 6, following operations are performed.

In this case, the creating a PIN code interface function is create_pin, in which a first parameter profile, a second parameter pin_obj, a third parameter pin, a fourth parameter pin_len, a fifth parameter puk and a sixth parameter puk_len are obtained from external.

In step 6-1, a PIN code object is defined and initialized.

Step 6-1 may include setting a PIN type, an access control right, a Key ID and maximum retry times according to the second parameter pin_obj of the function create_pin.

According to the first parameter profile of the function create_pin, a function sc_profile_get_pin_id is invoked to obtain the key ID and a maximum retry times is obtained by invoking a function sc_profile_get_pin_retries.

In step 6-2, a secret file is written into the card.

The writing a key interface function is invoked by invoking a card operating function card_ctl; the secret file is written into the card; the secret file is written into the card by invoking the writing a key interface function in the case that a value of command field cmd of function card_ctl is SC_CARDCTL_ENTERSAFE_WRITE_KEY. In this case, a PIN code object can be obtained according to a first parameter of the writing a key interface function.

In step 6-3, the PIN code object is buffered.

The PIN code object is buffered in the memory by invoking a function sc_pkcs15_pincache_add.

Further, a PUK code may be generated by performing step 6-1 and step 6-2 via invoking the creating a PIN code interface function create_pin.

Figure 7:
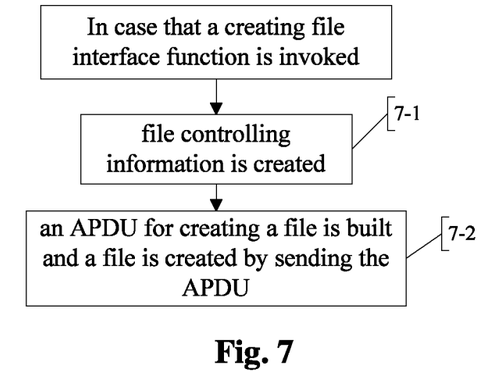
FIG. 7 is a flow chart in a case that a creating a file interface function is invoked in the present embodiment of the present application.

In a case that the creating a file interface function is invoked, as shown by FIG. 7, following operations are performed.

In this case, the creating a file interface function is create_file.

In step 7-1, file controlling information is created.

The file controlling information may be created by invoking a function construct_fci; further, if the card does not support function construct_fci, SC_ERROR_NOT_SUPPORTED is returned.

Further, before step 7-1, the method may include defining and initializing a local variable of the creating a file interface function.

In step 7-2, an APDU for creating a file is built and a file is created by sending the APDU.

A built APDU is transmitted by invoking a function sc_transmit_apdu and a return value and a state code of the function sc_transmit_apdu is received. Whether creating a file is successful is determined according to the return value and the state code.

In a case that the card operating interface function is invoked, following operations are performed.

In this case, the card operating interface function is card_ctl; a type of an operation to be executed is determined according to a value of a second parameter of the function, i.e. a command field cmd, which is obtained from external.

In a case that the value of cmd is a first value, the clearing a card interface function is invoked to clear the data and the file structure inside the card.

The first value may be SC_CARDCTL_ERASE_CARD.

In a case that the value of cmd is a second value, the writing a key interface function is invoked so as to write a key in the card.

The second value may be SC_CARDCTL_ENTERSAFE_WRITE_KEY.

In a case that the value of cmd is a third value, a key pair is generated in the card by invoking the generating a key pair interface function.

The third value may be SC_CARDCTL_ENTERSAFE_GENERATE_KEY.

In a case that the value of cmd is a fourth value, a sequence value of the card is obtained by invoking an obtaining card sequence number interface function.

The fourth value may be SC_CARDCTL_GET_SERIALNR.

In a case that the value of cmd is another value, SC_ERROR_NOT_SUPPORTED is returned which indicates that it's not supported by the card.

Figure 8:
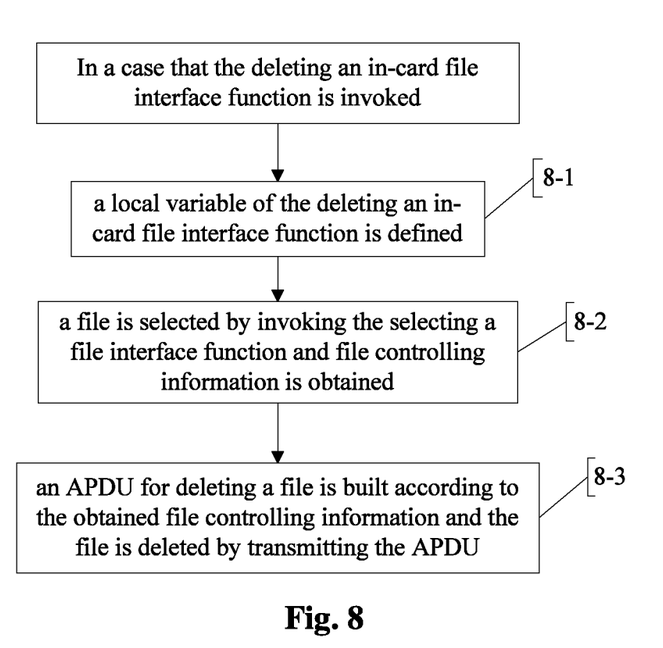
FIG. 8 is a flow chart in a case that a deleting an in-card file interface function is invoked in the present embodiment of the present application.

In a case that the deleting an in-card file interface function is invoked, as shown by FIG. 8, following operations are performed.

In this case, the deleting an in-card file interface function is delete_file. A first parameter card and a second parameter file of the function delete_file are obtained from external. The card is determined according to the first parameter card and context environment attribution of the card is checked; whether a deleting a file interface and a selecting a file interface are supported is determined, step 8-1 to step 8-3 are executed if the deleting a file interface and the selecting a file interface are supported; otherwise, it is returned that the deleting a file interface and the selecting a file interface are not supported.

In step 8-1, a local variable of the deleting an in-card file interface function is defined.

In step 8-2, a file is selected by invoking the selecting a file interface function and file controlling information is obtained.

The file interface function is invoked according to the second parameter file of the function delete_file. Further, if selecting a file is failed, the selecting a file interface returns an invalid parameter. For example, SC_ERROR_INVALID_ARGUMENTS is returned.

In step 8-3, an APDU for deleting a file is built according to the obtained file controlling information and the file is deleted by transmitting the APDU.

The APDU is transmitted by invoking function sc_transmit_apdu and whether deleting a file is successful is determined according to a return value and a state code of the function sc_transmit_apdu.

Figure 9:
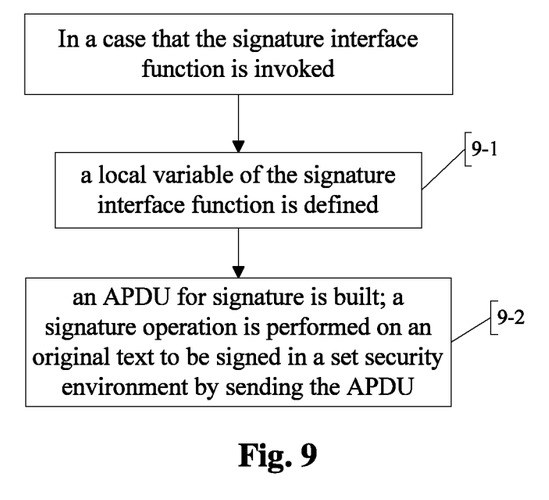
FIG. 9 is a flow chart in a case that a signature interface function is invoked in the present embodiment of the present application.

In a case that the signature interface function is invoked, as shown by FIG. 9, following operations are performed.

In this case, the signature interface function is decipher. A first parameter card, a second parameter plain, a third parameter plain_length, a fourth parameter signature, a fifth parameter signature_length are obtained from external. Context environment attribution of the card is checked according to the first parameter card and whether a signature interface is supported is determined; step 9-1 and step 9-2 are executed if the signature interface is supported; otherwise, it is returned that the signature interface is not supported.

In step 9-1, a local variable of the signature interface function is defined.

In step 9-2, an APDU for signature is built; a signature operation is performed on an original text to be signed in a set security environment by sending the APDU.

Signed APDU is built according to the second parameter plain and the third parameter plain_length, in which the second parameter plain indicates the original text and the third parameter plain_length indicates the length of the original text.

The APDU is transmitted by invoking a function sc_transmit_apdu and whether the signature is successful is determined according to a return value and a state code of the function sc_transmit_apdu; the signature interface function returns a signature operation result by the fourth parameter signature and a fifth parameter signature_length. When the signature is successful, the signature operation result returned by the signature interface includes a signature value. In this case, the fourth parameter signature indicates a value of a signature and the fifth parameter signature_length indicates a length of the signature.

Figure 10:
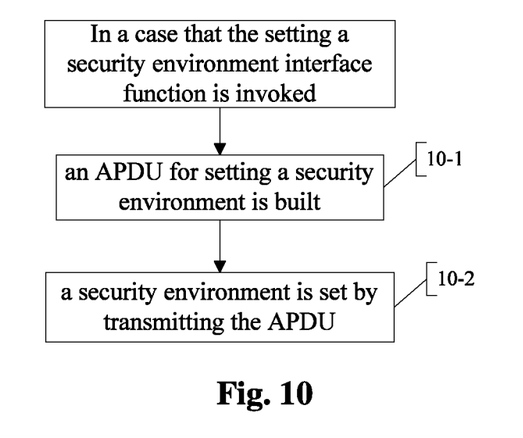
FIG. 10 is a flow chart in a case that a setting a security environment interface function is invoked in the present embodiment of the present application.

In a case that the setting a security environment interface function is invoked, as shown by FIG. 10, following operations are performed.

In this case, the setting a security environment interface function is set_security_env, a first parameter card and a second parameter env of the function set_security_env are obtained from external. The card is determined according to the first parameter card and context environment attribution of the card is checked. Whether a setting a security environment interface is supported is determined, step 10-1 and step 10-2 are executed if the set security environment interface is supported; otherwise, it is returned that the setting a security environment interface is not supported.

In step 10-1, an APDU for setting a security environment is built.

The APDU for setting a security environment is built according to the second parameter env of the function set_security_env; the key file attribution of the file controlling information can be obtained according to the second parameter evn. Further, to build the APDU for setting a security environment, besides the obtained key file attribution of the file controlling information, other attribution which reads from a preset cos manual is needed.

In step 10-2, a security environment is set by transmitting the APDU.

The APDU is transmitted by invoking a function sc_transmit_apdu and whether an operation of setting a security environment is successful is determined according to a return value and a state code of the function sc_transmit_apdu; the setting a security environment interface returns a return value which indicates the setting is successful or not.

Figure 11:
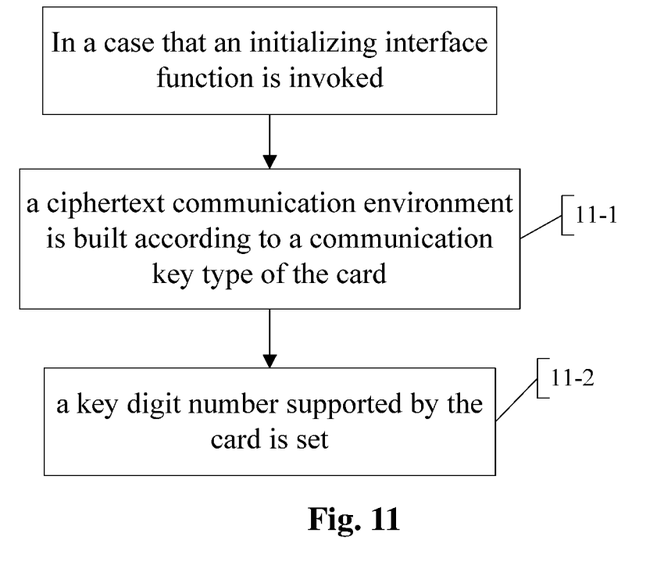
FIG. 11 is a flow chart in a case that an initializing interface function is invoked in the present embodiment of the present application.

In a case that an initializing interface function is invoked, as shown by FIG. 11, following operations are performed.

In this case, the initializing interface function is init.

In step 11-1, a ciphertext communication environment is built according to a communication key type of the card.

The communication key type may be DES or AES. The communication key type is determined by return data which is obtained by invoking a function get_data.

In step 11-2, a key digit number supported by the card is set.

For example, the key digit number supported by the card may be 512 or 2048.

In addition, the initializing interface returns an initializing result which indicates that the initializing is successful or not.

The described embodiments are only preferred embodiments of the application and the embodiments are not intended to limit the application. Any alteration or change easily obtained by those skilled in the art based on the application should fall in the scope of protection of the application.

The invention claimed is:

1. A method for implementing software and hardware drive supporting OpenSC, which is implemented by invoking an interface function by a middleware, comprising:
    building a cipher data communication environment according to a communication key type of a card, setting a key digit number supported by the card and returning an initialized result in a case that an initializing interface function is invoked;
    performing an operation of selecting a file according to attribution of a first structure in the selecting a file interface function, returning a result of the operation of the selecting the file; returning the result of the operation of the selecting the file in a case that a selecting a file interface function is invoked, wherein the result of the operation of the selecting the file contains file controlling information in a case that the operation of the selecting the file is successful;
    obtaining key file attribution of file controlling information according to a second parameter of the setting a security environment interface function, building an Application Protocol Data Unit (APDU) for setting a security environment by using the key file attribution, setting the security environment by transmitting the APDU for setting the security environment and returning a setting result in a case that a setting a security environment interface function is invoked; and
    obtaining original data to be signed and a length of the original data to be signed according to a second parameter and a third parameter of the signature interface function, using the original data to be signed and the length of the original data to be signed to build signed APDU, performing signature operation on the original data to be signed by transmitting the signed APDU and returning a result of a signature operation, wherein the result of the signature operation containing a signature value in a case that the signature operation is successful in a case that a signature interface function is invoked,
    wherein the operation of performing selecting a file according to attribution of the first structure in the selecting a file interface function comprises: in a case that type attribution of the first structure is a second preset value, length attribution of the first structure is 2, and a first byte of file ID attribution of the first structure is a fourth preset value, a pseudo file controlling information is built as an operation result of the selecting a file.

2. The method of claim 1, further comprising:
    invoking a corresponding card operating function to perform a corresponding operation on the card according to a second parameter of the card operating interface function in a case that a card operating interface function is invoked, wherein the corresponding operating function comprises:
        clearing data and a file structure in the card by invoking a clearing a card interface function in a case that a value of the second parameter of the card operating interface function is a first value;
        invoking a writing a key interface function to write a key in the card in a case that the value of the second parameter of the card operating interface function is a second value; and
        invoking a generating a key pair interface function to generate a key pair in the card in a case that the value of the second parameter of the card operating interface function is a third value.

3. The method of claim 2, wherein, in the case that the clearing a card interface function is invoked, an operation of selecting a master file (MF) in the card is performed, a deleting an in-card file interface function is invoked to delete the master file.

4. The method of claim 3, further comprising:
    in a case that a deleting an in-card file interface function is invoked, the following steps are performed:
        step 1 of selecting a file by invoking the selecting a file interface function according to a second parameter of the deleting an in-card file interface function and obtaining file controlling information; and
        step 2 of building an APDU for deleting a file according to the obtained file controlling information and deleting the file by transmitting the APDU for deleting a file.

5. The method of claim 2, wherein in a case that the writing a key interface function is invoked, the following steps are performed:
    step 1 of initializing information related to a key and a length of a key modular of the writing a key interface function according to a third parameter of the writing a key interface function;
    step 2 of creating a private key file object in a memory of a computer, obtaining information related to the private key file object and creating a private key file in the card;
    step 3 of setting a private key ID and the key modular length; and
    step 4 of writing a private key in the card and releasing the private key file object created in the memory.

6. The method of claim 5, wherein the private key file object is created by invoking a newly creating a file interface function; the related information of the private key file object is obtained according to a fifth parameter of the newly creating a file interface function.

7. The method of claim 2, wherein in a case that the generating a key pair interface function is invoked, the following steps are performed:
- step 1 of initializing related information and a key modular length of a key of the generating a key pair interface function according to a third parameter of the generating a key pair interface function;
- step 2 of creating a private key file object in a memory of a computer, obtaining related information of the private key file object and creating a private key file in the card;
- step 3 of creating a public key file object in the memory of the computer, obtaining related information of the public key file object and creating a public key file in the card;
- step 4 of setting a public key ID and a private key ID and the key modular length; and
- step 5 of generating a key pair and releasing the public key file object and the private key file object which are created in the memory.

8. The method of claim 7, wherein the private key file object is created by invoking a newly creating a file interface function, the related information of the private key file object is obtained according to a fifth parameter of the newly creating a file interface function.

9. The method of claim 1, the method further comprising:
in a case that deleting an in-card file interface function is invoked, the following steps are performed:
- step 1 of selecting a file by invoking the selecting a file interface function according to a second parameter of the deleting an in-card file interface function and obtaining the file controlling information; and
- step 2 of building an APDU for deleting a file according to the obtained file controlling information and deleting the file by transmitting the APDU for deleting a file.

10. The method of claim 1, wherein the second preset value is SC_PATH_TYPE_DF_NAME and the fourth preset value is 0x29.

11. The method of claim 1, further comprising:
in a case that a newly creating a file interface function is invoked, the following steps are performed:
- step 1 of obtaining related information of the file from a configuration file according to a second parameter of the newly creating a file interface function; and
- step 2 of creating a file in the card by invoking the creating a file interface function according to the obtained related information of the file; and in a case that a newly creating a standard file interface function is invoked, the following steps are performed:
- step 1 of obtaining information related to a standard file from a configuration file according to a second parameter of the newly creating a standard file interface function; and
- step 2 of creating a standard file in the card by invoking the creating a file interface function according to the information related to the standard file.

12. The method of claim 11, further comprising:
in a case that the creating a file interface function is invoked, the following steps are performed:
- step 1 of building file controlling information; and
- step 2 of building the APDU for creating a file according to the file controlling information and creating the file by transmitting the APDU for creating a file.

13. The method of claim 1, further comprising:
in a case that a creating a file interface function is invoked, the following steps are performed:
- step 1 of building file controlling information; and
- step 2 of building APDU for creating a file according to the file controlling information and creating a file by transmitting the APDU for creating a file.

14. The method of claim 1, further comprising:
in a case that a creating a PIN code interface function is invoked, the following steps are performed:
- step 1 of defining and initializing a PIN code object;
- step 2 of obtaining the PIN code object according to a first parameter of a writing a key interface function and invoking the writing a key interface function to write a secret file in the card; and
- step 3 of buffering the PIN code object in the memory.

15. The method of claim 1, wherein in a case that the interface function is invoked, the method further comprises:
locating a card which will perform a specific operation according to a parameter, in the interface function, wherein the card is an external incoming parameter; and
checking context environment attribution of the card.

* * * * *